L. K. SMITH.

JOURNAL BOX.

APPLICATION FILED NOV. 29, 1911.

Reissued Mar. 11, 1913. 13,545.

WITNESSES:

Fred White

T. F. Wallace

INVENTOR:

Luther K. Smith,

By Attorneys,

Fraser, Turner & Myers

UNITED STATES PATENT OFFICE.

LUTHER K. SMITH, OF MOBERLY, MISSOURI, ASSIGNOR TO AUGUSTUS CRANE BUZBY, OF PHILADELPHIA, PENNSYLVANIA.

JOURNAL-BOX.

13,545. Specification of Reissued Letters Patent. Reissued Mar. 11, 1913.

Original No. 941,661, dated November 30, 1909, Serial No. 494,338. Application for reissue filed November 29, 1911. Serial No. 663,180.

*To all whom it may concern:*

Be it known that I, LUTHER K. SMITH, a citizen of the United States, residing at Moberly, in the county of Randolph and State of Missouri, have invented certain new and useful Improvements in Journal-Boxes, of which the following is a specification.

My invention relates to journal boxes especially adapted to the journals of locomotive driving wheels, and other similar heavy journals, and my object is to provide a simple, strong and durable construction, which will be compact and generally free from the complication of the ordinary journal boxes used in this class of work.

A further object of my present invention is to provide a journal box so constructed as to permit of the withdrawal of the "brass" and cellar block, without disturbing the box body, and without jacking up the journal.

Figure 1:
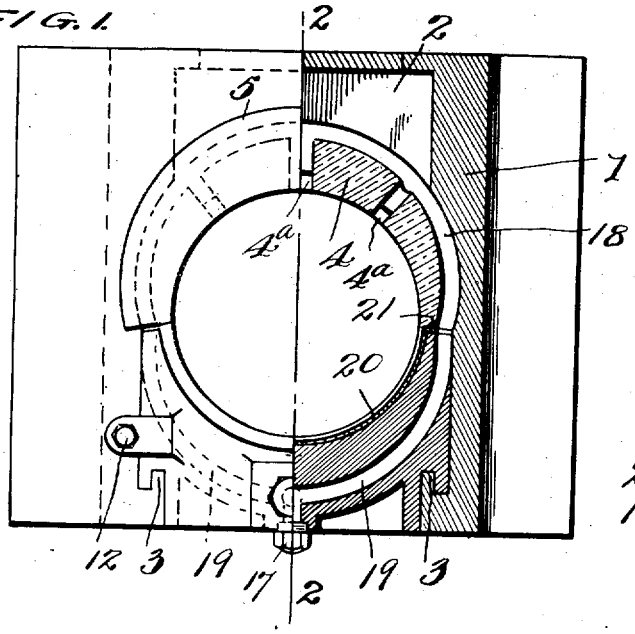
Figure 2:
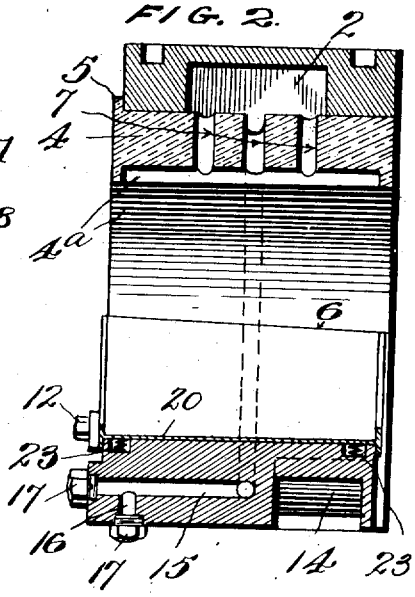
Figure 3:
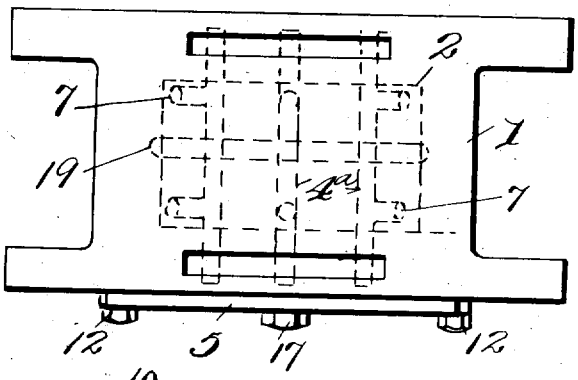
Figure 5:
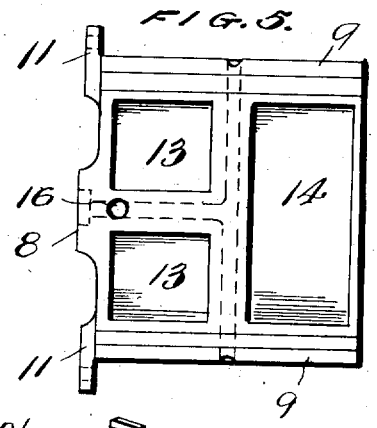
Figure 4:
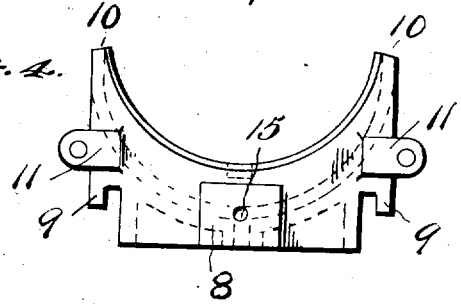
Figure 6:
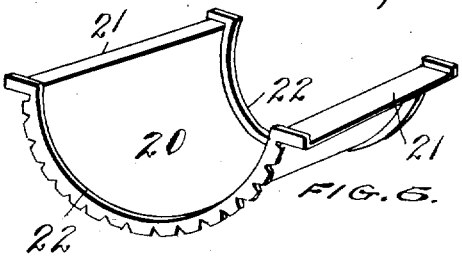

In the accompanying drawings, which illustrate my invention and form a part of this specification, Figure 1 is a front view partly in elevation and partly in section, of a journal box constructed in accordance with my invention. Fig. 2 is a central vertical cross section therethrough on the line 2—2 of Fig. 1. Fig. 3 is a top plan view thereof. Fig. 4 is a front elevation of the cellar block removed. Fig. 5 is a plan view thereof, and, Fig. 6 is a perspective view of the dust and dirt guard.

In the practical embodiment of my invention, I provide a journal box comprising a body member 1, which, as is ordinary, is provided with the journal opening extending through the lower portion thereof, whereby the same may be inserted about the journal, thus rendering the said body member of substantially inverted U-shape.

In accordance with my invention, I provide the said body member 1 with a chamber 2, which is cored out internally thereof, at the upper end of its said journal opening, and I further provide said member with internal shoulders at the lower end of the said journal opening, which shoulders have upstanding flanges 3, offset from the body of said member 1.

The "brass" 4 of the usual semi-cylindrical form is disposed within the upper portion of the journal opening of body member 1, and in accordance with my invention, is provided with a curved upstanding flange upon one end which abuts the front surface of said body member and with its longitudinal edges inclined longitudinally and downwardly toward the rear of said body member. The "brass" is also provided with spaced parallel longitudinal slots in its inner concaved surface, which slots communicate, by radial transverse openings 7, with the chamber 2 of the body member 1.

The cellar block 8 is provided with spaced longitudinal flanges 9 at the sides thereof, for relatively slidable interlocking engagement with the flanges 3 of the lower portion of body member 1, and also with downwardly and rearwardly inclined longitudinal edges 10 for engagement with the edges of the "brass" 4, whereby to prevent movement of said "brass" in one direction, the relative engagement of its flanges 5 preventing the same from moving in the opposite direction. Said cellar block 8 is also provided with sidewise projecting lugs or ears 11, which are apertured to receive suitable machine bolts 12, whereby to rigidly secure the same upon the body member 1, and maintain the "brass" in position as just described. Thus, it will be seen that by virtue of its slidable interlocking engagement with the lower portions of the body member 1, said cellar block rigidly connects the side portions of said body member and strengthens the same by providing a cross-brace and materially aids in preventing breaking and cracking of the same by the journal. Besides, having relatively abutting longitudinally inclined longitudinal edges, "brass" 4 and cellar block 8 further have the said edges thereof, transversely inclined as will be seen by references to Figs. 1 and 4, whereby to prevent the lower portions of said members from clamping inwardly upon the journal by reason of the great pressure exerted by the said journal against the upper central portion thereof.

The cellar block 8 is cored out in its upper face as shown at 13 (Fig. 5) and in its lower face as shown at 14 (Fig. 2), to lighten the same and said block is further provided with a longitudinal channel 15 extending inwardly and central from its front face and communicating adjacent its outer end with a transverse channel 16, opening through the lower face of said block, the outer ends of said channels 15 and 16 being closed by suitable cap nuts 17. The "brass" 4 and cellar block 8 are also provided with curved communicating channels 18 and 19, which communicate between the inner ends of the channel 15 of the cellar block, and the chamber 2 of the body member 1. Thus, a lubricant may be forced through the outer end of cellar block channel 15, or through its channel 16, and upwardly through channels 19 and 18 to the chamber 2 of body member 1, and fed from the latter through openings 7 into slots 4ª in the inner surface of "brass" 4 to be taken up by the journal as it is needed.

A dust and dirt guard is provided in connection with my improved journal box, and is shown in detail in Fig. 6 and comprises a curved plate 20, disposed upon the upper concaved surface of the cellar block 8, and provided with longitudinal side flanges 21, which may be disposed between the abutting edges 6 and 10 of "brass" 4 and cellar block 8 to hold said plate in position, said plate 20 being further provided with end flanges 22 which extend above and below the same, the upper edges of said flanges 22 abutting the periphery of the journal and the lower portions of said flanges extending against the outer front and rear surfaces of cellar block 8 to further hold the same in position. Springs 23 compressed between the upper surface of cellar block 8 and plate 20 serve to press the upper edges of its said flanges 22 against the journal.

Having fully described my invention, I claim:

1. A journal box comprising a body portion provided with an inverted U-shaped opening, a brass arranged in the upper portion of said inverted U-shaped opening, said brass being provided with an outwardly extending flange at one end thereof adapted to engage the outer side of said body portion, whereby the inward longitudinal movement of said brass is prevented when the same is arranged in its operative position, said brass being further provided with longitudinal edges inclined downwardly toward the inner side of said body portion, a cellar block adapted to be inserted in said inverted U-shaped opening after the insertion of said brass therein, said cellar block having portions adapted to coöperate with corresponding portions arranged upon said body portion, whereby said cellar block may be moved longitudinally into said body portion, said cellar block being provided with longitudinal edges inclined downwardly toward the inner side of said body portion, and arranged in engagement with said inclined edges of said brass, means for preventing the longitudinal movement of said cellar block toward the inner side of said body portion when the said cellar block is arranged in its operative position, and means for preventing the outward movement of said cellar block from its operative position, substantially as described.

2. A journal box, comprising a body portion provided with an inverted U-shaped opening, a brass arranged in the upper portion of said inverted U-shaped opening, said brass being provided with an outwardly extending flange adapted to engage the outer side of said body portion, whereby the inward longitudinal movement of said brass is prevented when the same is arranged in its operative position, said brass being further provided with longitudinal edges inclined downwardly toward the inner side of said body portion and beveled transversely, a cellar block adapted to be inserted into said inverted U-shaped opening after the insertion of said brass therein, said cellar block being adapted to be inserted within said inverted U-shaped opening by a longitudinal movement of the same, said cellar block being provided with longitudinal edges inclined downwardly toward the inner side of said body portion, said last named longitudinal edges being beveled transversely and arranged in engagement with the longitudinal edges of said brass, means for preventing the longitudinal movement of said cellar block toward the inner side of said body portion when said cellar block is arranged in its operative position, means for preventing the outward movement of said cellar block from its operative position, whereby said brass and said cellar block are locked together and prevented from having relative movement with relation to each other, substantially as described.

3. In a journal box, the combination of a body, a bearing brass mounted therein, a cellar mounted in the body and said cellar engaging the brass and said engagement providing means for preventing longitudinal movement of the latter in one direction, said brass adapted to be removed upon the removal of the cellar.

4. In a journal box, the combination of an open-front body, a brass insertible through the open front of the body, a cellar also insertible through the open front of the body and having means engaging with the brass to prevent forward longitudinal displacement of the latter, said brass adapted to be removed upon the removal of the cellar.

5. In a journal box, the combination of a body having a journal chamber open at its front and rear, a brass insertible into the body through the open-front of the chamber and provided with means adapted to engage the body to prevent displacement of the brass inwardly, and a cellar insertible into the body and having a portion adapted to overlap a portion of the said brass longitudinally and to engage the brass to prevent longitudinal displacement thereof outwardly, said brass adapted to be removed upon the removal of the cellar.

6. In a journal box, the combination of a body having a journal chamber open at its front and rear, a brass mounted therein, and a cellar mounted in the body, the lower edges of the brass being inclined downwardly from the front and the upper edges of the cellar being inclined correspondingly to the lower edges of the brass whereby the cellar locks the brass against forward longitudinal displacement.

7. In a journal box, the combination of a chambered body of inverted U-shaped form and open at the bottom, upwardly extending horizontal flanges on the inner faces of the side members of the body, a cellar having at its sides downwardly-extending horizontal flanges adapted to interlock with the flanges on the body whereby the cellar is supported on the latter and also forms a connecting means between the lower ends of the side members of the body, the interlocking faces of said cellar and body flanges being substantially perpendicular to a line of strain tending to separate the lower sides of the body, whereby said cellar strengthens said body at its open end.

8. In a journal box, the combination of a body, a brass mounted therein, a cellar disposed in the body under the brass, and having its upper surface substantially conforming in shape to the journal, said brass and cellar surrounding the journal, and a dust guard and grease holder fitting the upper surface of the cellar and having lateral flanges clamped between the brass and cellar.

9. In a journal box, the combination of a body, a brass therein, a cellar mounted in the body under the brass, and having its upper surface substantially conforming in shape to the journal, said brass and cellar surrounding the journal, and a dust guard and grease holder comprising an approximately semi-cylindrical body fitting the upper surface of the cellar and having flanges at its front and rear end extending below the body and outside the cellar to engage the ends of the cellar and extending above the body for retaining grease.

10. In a journal box, the combination of a body, a brass, a cellar beneath the brass, a dust-guard and grease holder comprising a semi-cylindrical body fitting the upper surface of the cellar and having lateral flanges clamped between the brass and cellar and also end flanges, said end flanges extending above and below the semi-cylindrical body, and said lower flanges adapted to extend outside of said cellar.

In witness whereof, I have hereunto signed my name in the presence of two subscribing witnesses.

LUTHER K. SMITH.

Witnesses:
W. E. LUTES,
J. G. CARNEY.